US011219963B2

(12) United States Patent
Van Fossen

(10) Patent No.: US 11,219,963 B2
(45) Date of Patent: Jan. 11, 2022

(54) SOLDERING STATION

(71) Applicant: APEX BRANDS, INC., Apex, NC (US)

(72) Inventor: Eric Van Fossen, Huntersville, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/294,476

(22) PCT Filed: Oct. 8, 2020

(86) PCT No.: PCT/US2020/054701
§ 371 (c)(1),
(2) Date: May 17, 2021

(87) PCT Pub. No.: WO2021/076389
PCT Pub. Date: Apr. 22, 2021

(65) Prior Publication Data
US 2021/0362259 A1 Nov. 25, 2021

Related U.S. Application Data

(60) Provisional application No. 62/916,295, filed on Oct. 17, 2019.

(51) Int. Cl.
*B23K 3/00* (2006.01)
*B23K 3/03* (2006.01)
*B23K 3/08* (2006.01)

(52) U.S. Cl.
CPC ............... *B23K 3/033* (2013.01); *B23K 3/08* (2013.01)

(58) Field of Classification Search
CPC ..... B23K 3/033; B23K 3/08; B23K 3/00–087
(Continued)

(56) References Cited

U.S. PATENT DOCUMENTS

| 6,580,050 | B1 | 6/2003 | Miller et al. |
| 2001/0000900 | A1* | 5/2001 | McAmmond ........ B23K 3/0478 219/229 |

(Continued)

OTHER PUBLICATIONS

International Search Report and Written Opinion from related international application PCT/US2020/054701, dated Feb. 24, 2021, all pages cited in its entirety.

(Continued)

*Primary Examiner* — Kiley S Stoner
(74) *Attorney, Agent, or Firm* — Burr & Forman, LLP

(57) ABSTRACT

A soldering station includes a first tool port configured to interface with a first soldering tool, a second tool port configured to interface with a second soldering tool, a display configured to display information relating to one or both of the first and second soldering tools, and processing circuitry configured to interface with the display to provide the information relating to one or both of the first and second soldering tools. The first tool port has a first indicator associated therewith and the second tool port has a second indicator associated therewith. The first indicator generates a first color that is also generated at a third indicator associated with the first soldering tool. The second indictor generates a second color that is also generated at a fourth indicator associated with the second soldering tool, the first and second colors being different from each other.

20 Claims, 6 Drawing Sheets

(58) Field of Classification Search
USPC .......... 228/102–103, 8–12, 51–55; 219/85.1
See application file for complete search history.

(56) References Cited

U.S. PATENT DOCUMENTS

| | | | | |
|---|---|---|---|---|
| 2004/0195292 | A1* | 10/2004 | Tetuo .................... | B23K 3/033 228/51 |
| 2006/0191890 | A1* | 8/2006 | Agronin ................ | B23K 3/033 219/241 |
| 2010/0224598 | A1* | 9/2010 | Liu ...................... | B23K 3/0478 219/85.16 |
| 2014/0277680 | A1* | 9/2014 | Youngquist .......... | B23K 1/0016 700/121 |
| 2015/0202753 | A1* | 7/2015 | Mittmann .............. | B23K 3/08 362/120 |

OTHER PUBLICATIONS

Weller, Weller WX datasheet (2011) www.ocotopart.com, entire document (online), (https://datasheet.octopart.com/WX-2020-Weller-datasheet-12388016.pdf).

Coopertools, "Electronic Catalog", www.jameco.com, internet archive, Jul. 24, 2015, p. 3 (online) (https://web.archive.org/web/20150724021514/https://www.jameco.com/Jameco/Products/ProdDS/2082821.pdf).

\* cited by examiner

SOLDERING STATION

TECHNICAL FIELD

Example embodiments generally relate to soldering tools and, in particular, relate to such a soldering station having the ability to support multiple soldering irons and accessories and indicate relationships therebetween, and other useful information, to operators efficiently.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs. For example, some tip geometries (or shapes) may include a fine conical tip, a tapered chisel tip, a pyramid tip, a triangular flat face tip, a wide flat face tip, etc., where different sizes may further be available within each respective shape category.

Soldering is often performed at a work station, and may be performed in some cases using soldering irons that simply plug into the wall outlet nearby. However, some operators prefer (and some professional operators require) more performance and control options than those that would typically be provided by a unit that simply plugs into a wall outlet. Accordingly, soldering stations have been developed, which can have varying levels of complexity and added features. Moreover, some soldering stations can support multiple soldering irons with or without the addition of accessories such as vacuum or blowing tools. In this regard, the soldering station may include multiple connection ports to which each respective device can be connected.

When a number of these tools end up at the same workstation (along with their respective cords), it can be difficult to determine or remember which tool is connected to which port and, if applicable, which display details correspond to which tool as well. If the tools have different settings used for different parts of a single job, the confusion can slow progress or even lead to mistakes and the need for rework. Thus, it may be desirable to provide an improved work station that can, for example, enable the operator to know which tool goes with which port in a very intuitive way. With merely a quick glance, the operator may be assured as to exactly which tool goes with which port (and corresponding display details, if applicable) so that confusion and mistakes may be avoided. Moreover, the operator does not need to follow (or untangle) cords to determine which tool is connected to which port.

BRIEF SUMMARY OF SOME EXAMPLES

Some example embodiments may enable the provision of a soldering station that employs features for quickly identifying which soldering tools correspond to a respective port and, if applicable, display details.

In an example embodiment, a soldering station may be provided. The soldering station may include a first tool port configured to interface with a first soldering tool, a second tool port configured to interface with a second soldering tool, a display configured to display information relating to one or both of the first and second soldering tools, and processing circuitry configured to interface with the display to provide the information relating to one or both of the first and second soldering tools. The first tool port may have a first indicator associated therewith and the second tool port may have a second indicator associated therewith. The first indicator may generate a first color that is also generated at a third indicator associated with the first soldering tool. The second indictor may generate a second color that is also generated at a fourth indicator associated with the second soldering tool, the first and second colors being different from each other.

In another example embodiment, a device correlation system for a soldering station is provided. The soldering station may include a first tool port configured to interface with a first soldering tool, and a second tool port configured to interface with a second soldering tool. The device correlation system may include a first indicator disposed at the first tool port, a second indicator disposed at the second tool port, a third indicator disposed at the first soldering tool, and a fourth indicator disposed at the second soldering tool. The first and third indicators may be configured to each generate a first color, and the second and fourth indicators may be configured to each generate a second color, where the first and second colors are different from each other.

In another example embodiment, a method of correlating devices to respective ports on a soldering station is provided. The soldering station may include a first tool port configured to interface with a first soldering tool, and a second tool port configured to interface with a second soldering tool. The method may include receiving an indication of connection of the first soldering tool to the first tool port, receiving an indication of connection of the second soldering tool to the second tool port, causing generation of a first color of light at a first indicator disposed at the first tool port and a second indicator disposed at the first soldering tool, and causing generation of a second color of light at a third indicator disposed at the second tool port and a fourth indicator disposed at the second soldering tool. The first and second colors of light may be different from each other.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
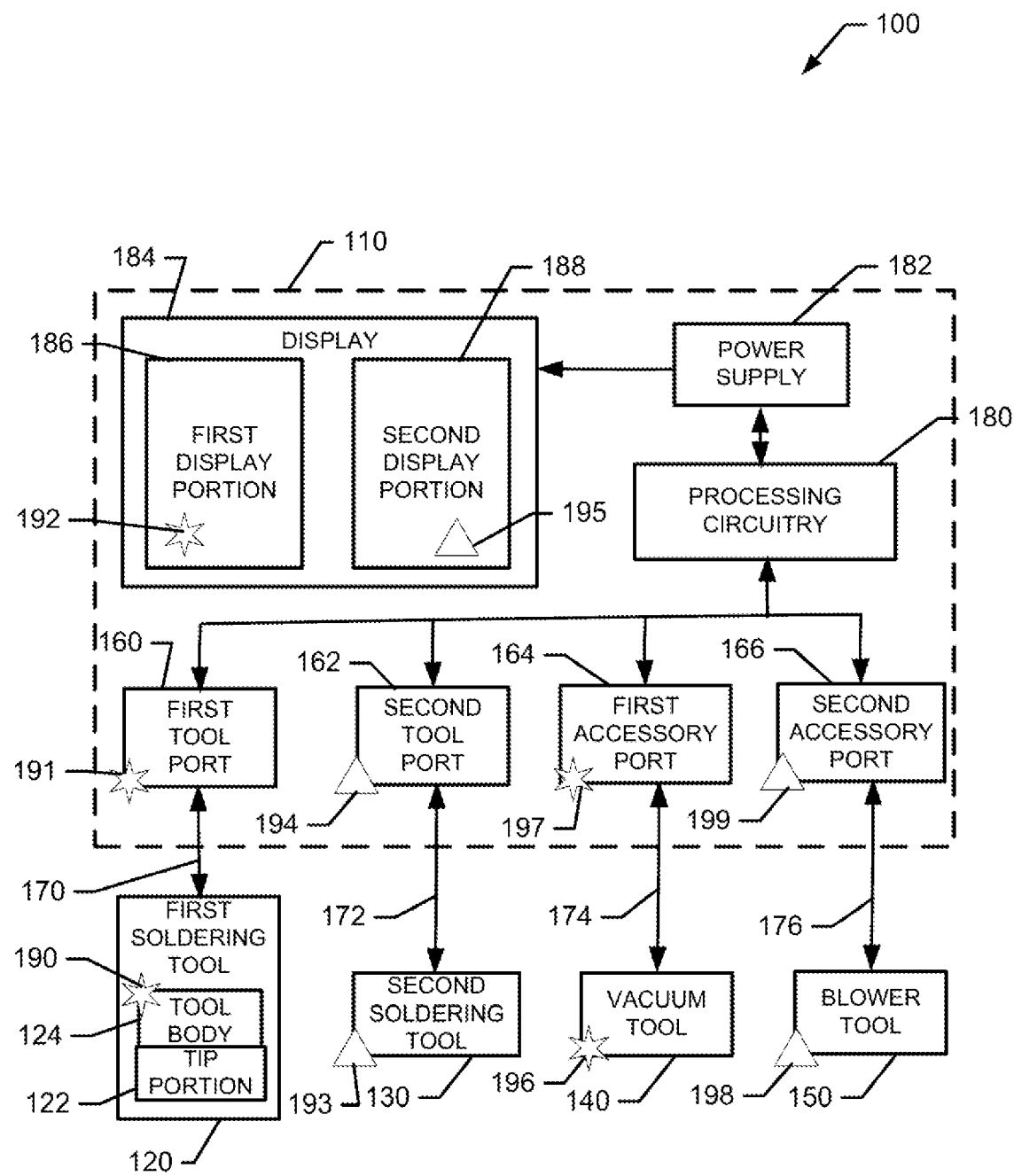
FIG. 1 illustrates a block diagram of a soldering station according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a soldering station that includes features that make it easy to detect correspondence between individual tools and the ports and displays associated with each one. In some cases, the use of light emitting diodes (LEDs) or other light sources may be employed to assist in this regard. However, other strategies and features are also contemplated as described in greater detail below.

FIG. 1 illustrates a soldering system 100 according to an example embodiment. As shown in FIG. 1, the soldering system 100 of an example embodiment may include a soldering station 110 and multiple soldering tools (e.g., first soldering tool 120 and second soldering tool 130). The soldering system 100 may also include one or more accessories such as, for example, a vacuum tool 140 and/or a blower tool 150. The vacuum tool 140 may be configured to vacuum up excess solder (or other materials), and the blower tool 150 may be used to expel air for cleaning the area around a joint or components that are about to be soldered. Each of the tools and accessories may be operably coupled to the soldering station 110 by a corresponding port (e.g., first tool port 160, second tool port 162, first accessory port 164 and second accessory port 166) and a corresponding connection assembly (e.g., first cord 170, second cord 172, first accessory tube 174 and second accessory tube 176).

The soldering station 110 may also include processing circuitry 180 and a power supply 182 (e.g., mains power). The processing circuitry 180 may take the form of a central processing unit (CPU) or other controller in some cases. The processing circuitry 180 may be configured to perform data processing, control function execution and/or other processing and management services for the soldering station 110 according to an example embodiment. In some embodiments, the processing circuitry 180 may be embodied as a chip or chip set. In other words, the processing circuitry 180 may comprise one or more physical packages (e.g., chips) including materials, components and/or wires on a structural assembly (e.g., a baseboard). In an example embodiment, the processing circuitry 180 may include one or more instances of a processor and memory that may be in communication with or otherwise control various components to which the processing circuitry 180 is operably coupled.

The soldering station 110 may also include a user interface, which may be embodied as or include a display 186. In some cases, the display 184 could be a touch screen display through which commands or inputs may be provided to the processing circuitry 180. Otherwise, separate controls may be provided for interfacing with the display 184 including buttons, dials, keys, and/or the like. In some cases, the display 184 may include or otherwise be configured to show separate data corresponding to each respective one of the soldering tools and/or accessories. For example, the display 184 may include a first display portion 186 to display information associated with the first soldering tool 120 and a second display portion 188 to display information associated with the second soldering tool 130. The information may include, for example, current status information (e.g., on/off, fault, heating up, at temperature, standby mode), temperature setting information, current temperature, and/or the like.

Although details of some of the components included in the first and second soldering tools 120 and 130 are only shown for the first soldering tool 120, it should be appreciated that each of the soldering tools may generally include similar components. In this regard, the first soldering tool 120 includes a tip portion 122 and a tool body 124. The tool body 124 may include a handle or handpiece that is grasped by the operator. In some cases, the handpiece may include controls for the first soldering tool 120. However, in other cases, controls may be provided at the soldering station 110. The tip portion 122 may include a tip (or bit), which may be fixed or removable. The tip may include a heater that may be or include a resistive element that generates heat responsive to the running of current therethrough. The heater may be disposed at or near the tip of the tip portion to heat metal in the tip as the temperature of the heater rises. The heated tip may then be used to melt solder for creation of a solder joint.

As noted above, the second soldering tool 130 may also include its own tool body and tip portion, each of which may be functionally the same as the tip portion 122 and/or tool body 124 described above. Although functionally similar, however, the first soldering tool 120 and the second soldering tool 130 could nevertheless have either the same or different characteristics or components, and otherwise be of the same or different types. In some cases, the tool bodies of the first and second soldering tools 120 and 130 may be the same, but different removable tip portions may be attached to the respective tool bodies. Thus, the first and second soldering tools 120 and 130 could be visually different and distinguishable from each other, or may be visually identical. However, in either case, as noted above, when sharing the same work space, the first cord 170 and the second cord 172 may become at least visually entangled so that it is hard to know which tool is connected to which port. This may also make it difficult to appreciate which display portion correlates to which tool and port as well.

In order to eliminate any ambiguity relative to matching of tools and accessories to respective ports and display portions, some example embodiments may employ indicia elements at the ports and tools/accessories. The indicia elements may unambiguously and very quickly (i.e., at a glance) enable the operator to determine correspondence between tools/accessories and respective ports. In some cases, the display portions may also incorporate visual cues that enable correlation to further be made between the ports, tools, accessories and the display portions of the display 184 as well.

In this regard, for example, the first soldering tool 120 may include an indicator 190 disposed at a portion thereof.

The indicator 190 of the first soldering tool 120 may, for example, include a light (or light ring) disposed at the tool body 124 thereof. The indicator 190 may include one or more LEDs capable of generating different colors in fixed (e.g., one solid selected color) or dynamic (e.g., cyclic blinking or patterned blinking) display style. Accordingly, in some cases, the color may be selected to merely identify the device, and the display style may be used to indicate information about device status. For example, the indicator 190 may have a blue color to identify blue as the color associated with the first soldering tool 120, and various display styles can be employed to provide information about the status of the first soldering tool 120. In this regard, again by way of example, if the color blue is solidly displayed, the first soldering tool 120 may be assumed to be at its desired temperature. Meanwhile, the color blue may blink at a slow pace to indicate standby mode. The pace of blinking may quicken somewhat to show the device is heating up. Moreover, the pace may have a rate that is proportional to the proximity to the desired temperature (e.g., quickening to a very rapid pace as the desired temperature is approached, and then turning solid when reached).

In other examples, certain specific colors (e.g., yellow and red) may be reserved for and/or used to indicate very specific conditions. For example, yellow may indicate standby mode, and red may indicate a fault, or that the tool is at temperature. In such examples, only colors other than red and yellow may be used to distinguish tools that are ready for operation, and the certain reserved colors may only be used to indicate specific modes or states, particularly those that may require immediate user attention or care. However, it should be appreciated that by having the option to select different colors and display styles, a host of different types of information can be communicated via the indicator 190 in addition to the correlation function that enables quick correlation between devices, ports, and display portions. The processing circuitry 180 may communicate with the first soldering tool 120 to direct the color to be displayed at the indicator 190 and, if desired, also the display style.

In order to provide the correlation function between devices and ports, the first tool port 160 may also include an indicator 191. The processing circuitry 180 may also communicate with the first tool port 160 and/or the indicator 191 to correlate color selection (and display style) with the first soldering tool 120 and the indicator 190. Thus, the indicators 190 and 191 may share the same display color and display style based on instructions from the processing circuitry 180, or based on information provided therefrom, that is then used to drive preconfigured settings for display of color (i.e., color selection) and display style. In some cases, the processing circuitry 180 may also be configured to interface with the display 184 to ensure that the first display portion 186 displays visual indicia (or cues) 192 that correlates to the indicators 190 and 191. For example, if blue is the color selected for the first soldering tool 120 and the tool is steady state and ready for operation, the indicator 190 at the first soldering tool 120 may be solid blue. The indicator 191 at the first tool port 160 may also be solid blue, and visual indicia 192 in the form of a solid blue indicator or cue (e.g., including a blue ring or border around the information displayed at the first display portion 186) may also be provided on the first display portion 186. Accordingly, just by quickly taking a glance, the operator can see the solid blue indicators 190 and 191 along with the blue visual indicia 192 to correlate the tool, port and display portions that are associated with the first soldering tool 120.

The second soldering tool 130 may include an indicator 193 that can be correlated to the second tool port 162 in the same manner described above. In this regard, the second tool port 162 may include an indicator 194. The processing circuitry 180 may communicate with the second tool port 162 and/or the indicator 194 to correlate color selection (and display style) with the second soldering tool 130 and the indicator 193. Thus, the indicators 193 and 194 may share the same display color and display style as also described above. If applicable, the second display portion 188 may include visual indicia 195 that is also correlated to the indicators 193 and 194 of the second soldering tool 130 and the second tool port 162, respectively. For example, if green is the color selected for the second soldering tool 130 and the tool is steady state and ready for operation, the indicator 193 at the second soldering tool 130 may be solid green. The indicator 194 at the second tool port 162 may also be solid green, and visual indicia 195 in the form of a solid green indicator or cue (e.g., including a green ring or border around the information displayed at the second display portion 188) may also be provided on the second display portion 188. Again, the operator can quickly see the solid green indicators 193 and 194 along with the green visual indicia 195 to correlate the tool, port and display portions that are associated with the second soldering tool 130.

A similar paradigm may also be employed for accessories. However, in some cases, since accessories are often used with (or even attached to) a corresponding one of the soldering tools, the accessories may share the same color scheme as the tool to which they correlate. For example, the vacuum tool 140 may include an indicator 196 thereat, and the first accessory port 164 may also include an indicator 197. The blower tool 150 include an indicator 198 thereat, and the second accessory port 166 may also include an indicator 199. If the vacuum tool 140 is being used with the first soldering tool 120, then (according to the example above) the indicators 196 and 197 may each be solid blue as well. Likewise, if the blower tool 150 is being used with the second soldering tool 130, then (again according to the example above) the indicators 198 and 199 would also each be solid green. Of note, in some cases, the accessories themselves (i.e., the vacuum tool 140 and the blower tool 150) may not include indicators 196 and 198. In such cases, just the indicators 198 or 199 would be used to indicate pairings with respective tools.

Figure 2:
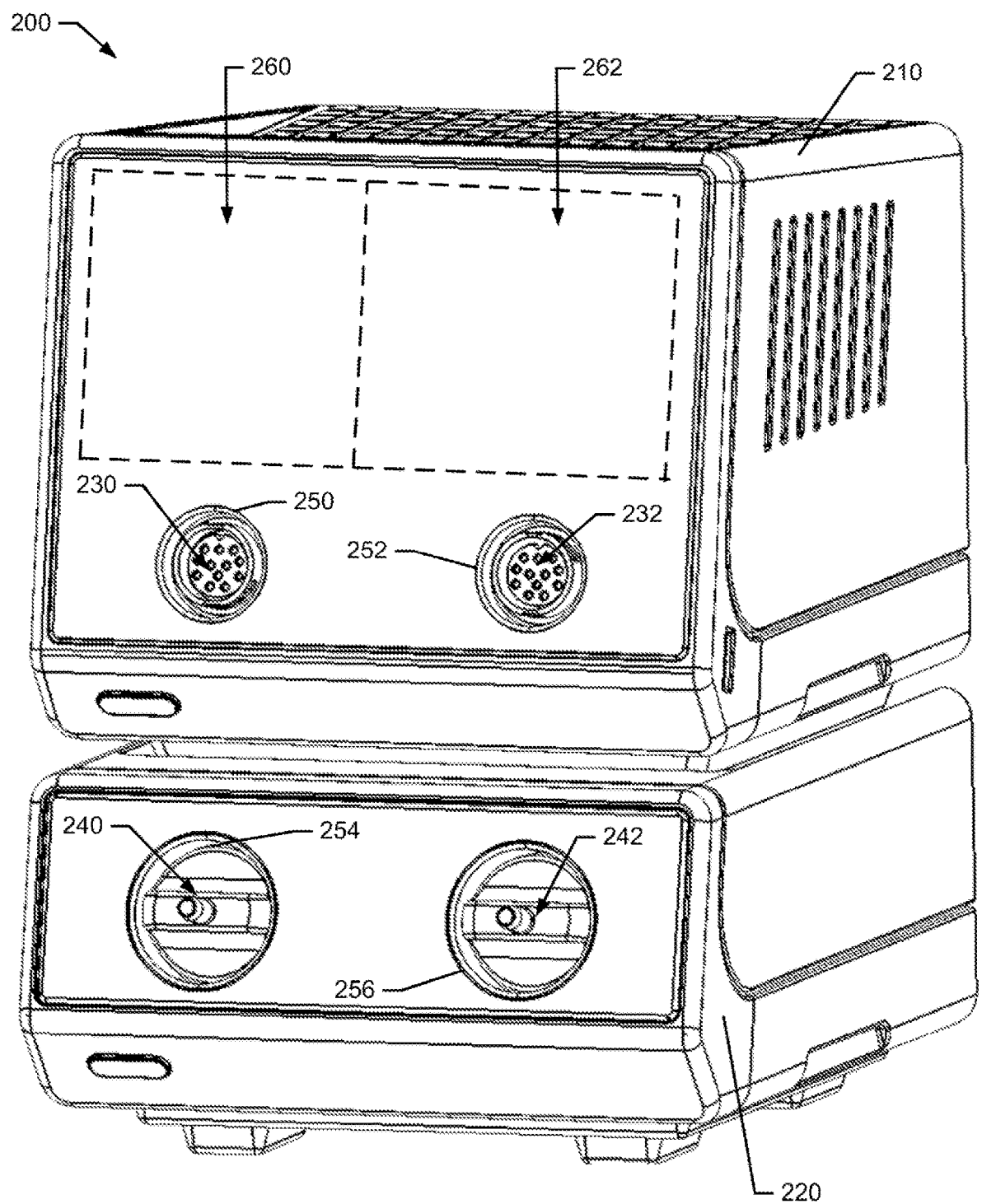
FIG. 2 illustrates a perspective view of one example implementation of the soldering tool of FIG. 1 according to an example embodiment.
Figure 3:
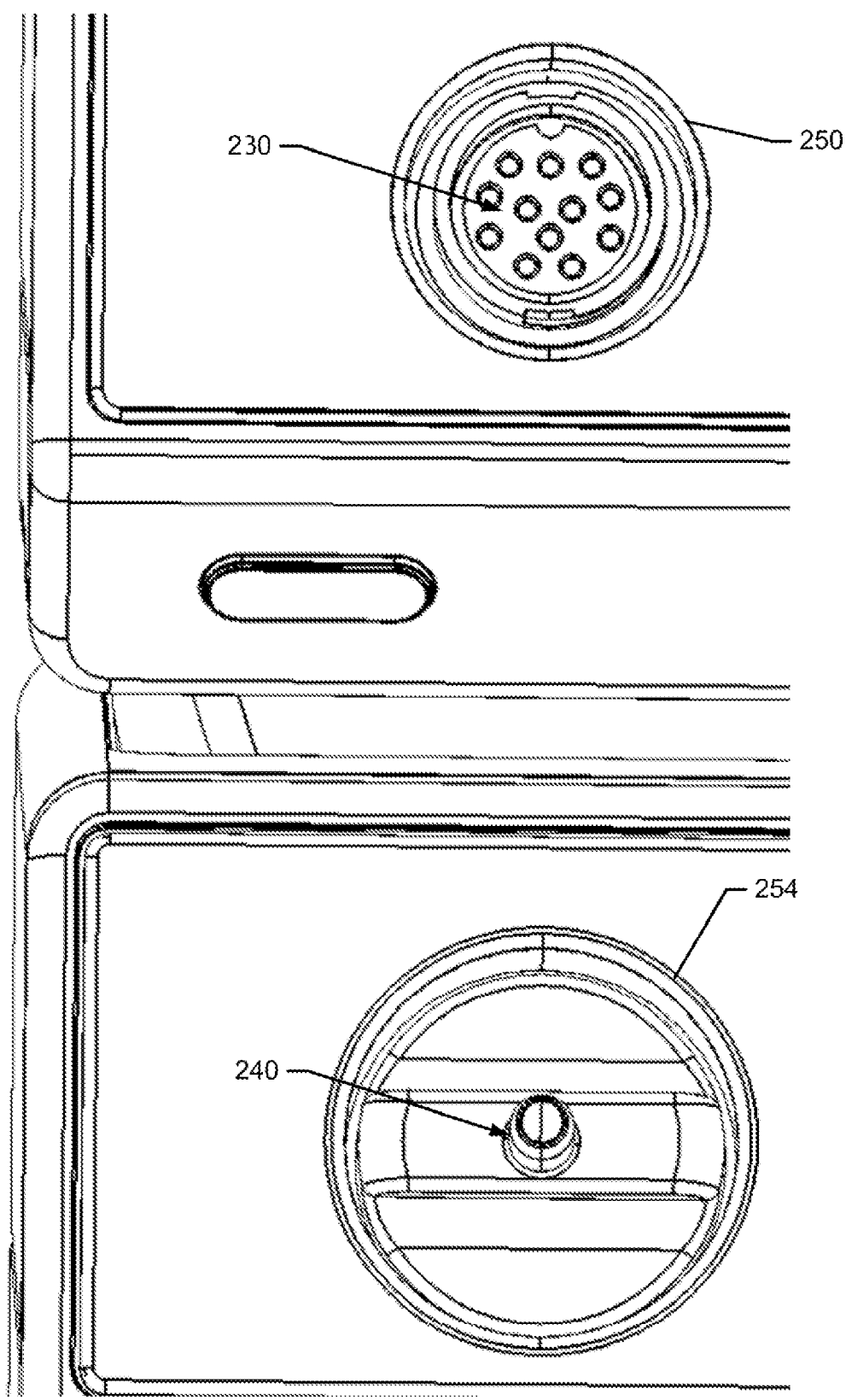
FIG. 3 illustrates a front view of the ports of the soldering station in accordance with an example embodiment.

FIG. 2 illustrates a perspective view of a soldering station 200 that may be an example of the soldering station 110 described in reference to FIG. 1. FIG. 3 shows more detail on some of the ports of the soldering station 200. Referring now to FIGS. 2 and 3, the soldering station 200 may include a main unit 210 and an accessory unit 220, which may include components for moving air associated with vacuum and/or blower functions. Although these units are shown as being separate (and stacked) in FIG. 2, they could be integrated into one housing in alternative embodiments. In this example, power may be separately provided to each unit. However, both units could be powered by a common power source in some cases.

In this example, the main unit 210 includes first tool port 230 and second tool port 232 (which correspond to first and second tool ports 160 and 162, respectively, from FIG. 1). Meanwhile, the accessory unit 220 includes first accessory port 240 and second accessory port 242 (which correspond to first and second accessory ports 164 and 166, respectively, from FIG. 1). The first soldering tool 120 may be operably coupled to the first tool port 230 via a plug and cord (e.g., the first cord 170), and the second soldering tool 130 can be operably coupled to the second tool port 232 via a plug and cord (e.g., the second cord 172). The vacuum tool 140 (or the blower tool 150) could be attached via a hose (e.g., first hose 174 or second hose 176) to either of the first accessory port 240 or the second accessory port 242.

In this example, a first ring indicator 250 is provided to extend around a periphery of the first tool port 230. The first ring indicator 250 is an example of the indicator 191 of FIG. 1. The first ring indicator 250 may be annular in shape, and may extend around all outer edges of the first tool port 230 so that the first ring indicator 250 may be visible even when a plug or connector is inserted therein. The first ring indicator 250 may be embodied as an assembly of LED lights that may be provided behind an annular lens that evenly distributes the light that passes therethrough. The first ring indicator 250 may have a fixed or selectable (e.g., via the processing circuitry 180) color association to determine the color that is displayed by the first ring indicator 250 when a tool is operably coupled the corresponding port (e.g., the first tool port 230).

A second ring indicator 252 is provided to extend around a periphery of the second tool port 232. The second ring indicator 252 is an example of the indicator 194 of FIG. 1. The second ring indicator 252 may be annular in shape, and may extend around all outer edges of the second tool port 232 so that the second ring indicator 252 may also be visible even when a plug or connector is inserted therein. The second ring indicator 252 may be embodied as an assembly of LED lights that may be provided behind an annular lens that evenly distributes the light that passes therethrough. The second ring indicator 252 may also have a fixed or selectable color association to determine the color that is displayed by the second ring indicator 252 when a tool is operably coupled to the corresponding port (e.g., the second tool port 232).

A third ring indicator 254 is provided to extend around a periphery of the first accessory port 240. The third ring indicator 254 is an example of the indicator 197 of FIG. 1. The third ring indicator 254 may be annular in shape, and may extend around all outer edges of the first accessory port 240 so that the third ring indicator 254 may also be visible even when a hose is connected to the first accessory port 240. The third ring indicator 254 may be embodied as an assembly of LED lights that may be provided behind an annular lens that evenly distributes the light that passes therethrough. The third ring indicator 254 may also have a fixed or selectable color association to determine the color that is displayed by the third ring indicator 254 when an accessory (e.g., blower or vacuum) is operably coupled to the corresponding port (e.g., the first accessory port 240).

A fourth ring indicator 256 is provided to extend around a periphery of the second accessory port 242. The fourth ring indicator 256 is an example of the indicator 199 of FIG. 1. The fourth ring indicator 256 may be annular in shape, and may extend around all outer edges of the second accessory port 242 so that the fourth ring indicator 256 may also be visible even when a hose is connected to the second accessory port 242. The fourth ring indicator 256 may be embodied as an assembly of LED lights that may be provided behind an annular lens that evenly distributes the light that passes therethrough. The fourth ring indicator 256 may also have a fixed or selectable color association to determine the color that is displayed by the fourth ring indicator 256 when an accessory is operably coupled to the corresponding port (e.g., the second accessory port 242).

As can be appreciated from the descriptions above, the tools and accessories that are used together may be color coordinated to quickly indicate the correspondence. Thus, for example, if a soldering tool (e.g., the first soldering tool 120) is coupled to a respective port (e.g., the first tool port 230) and the vacuum tool 140 is coupled to the first accessory port 240 to be used together for a desoldering operation, the first indicator ring 250, the third indicator ring 254, and (if applicable) the indicators on each respective tool/accessory may all share the same color (e.g., blue). This enables a very quick glance to indicate the associations between the tools and ports (and corresponding display portion) that are being used to support the desoldering operation. The same association paradigm could also apply to pairing the blower tool 150 with a corresponding one of the soldering tools.

The display portion on the main unit 210 may be divided into two parts including a first display portion 260 (an example of first display portion 186) and a second display portion 262 (an example of the second display portion 188). As can be appreciated from FIG. 2, the first display portion 260 is proximate to and therefore spatially correlated to the first tool port 230 since it is immediately above the first tool port 230. The second display portion 262 is also proximate to and therefore spatially correlated to the second tool port 232.

Figure 4:
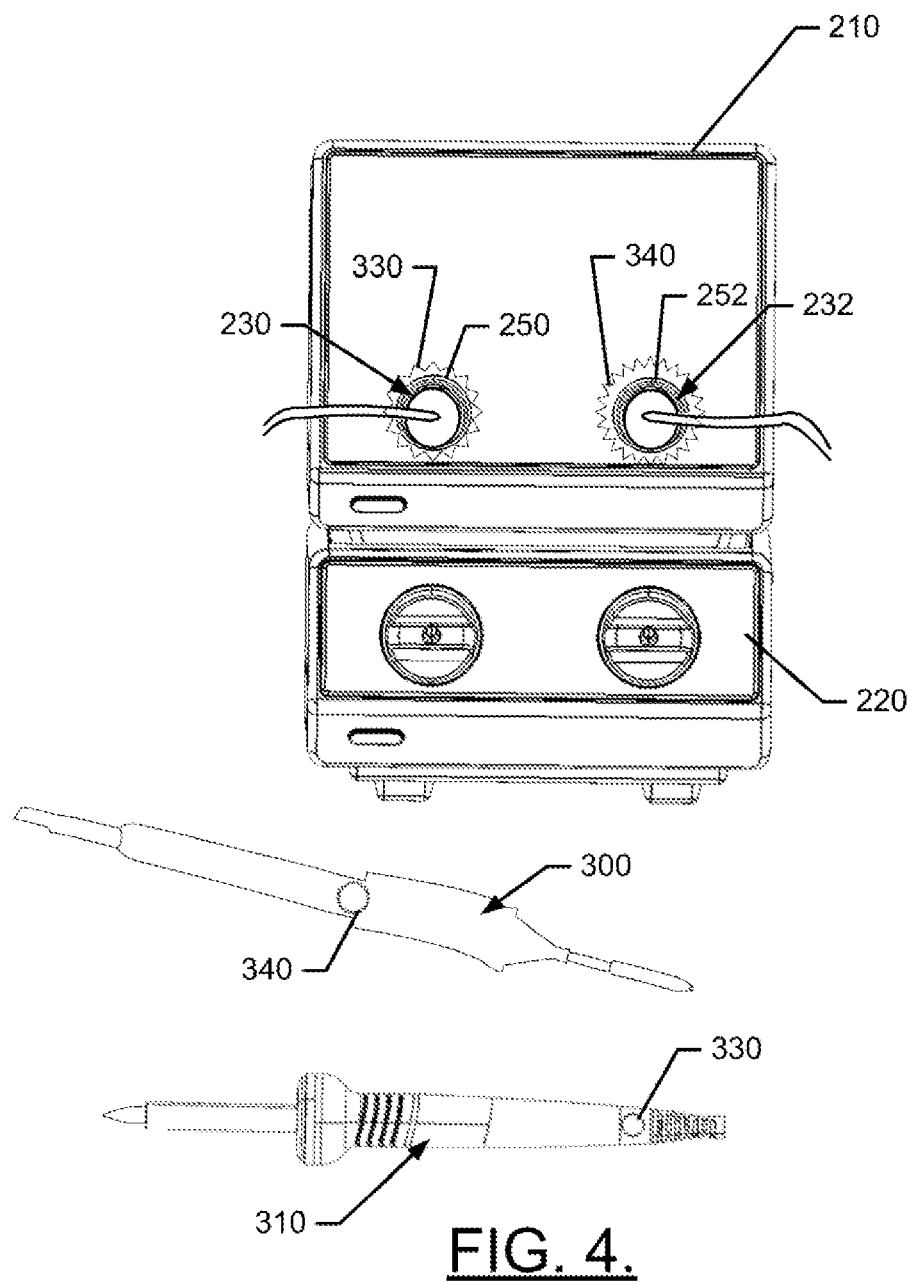
FIG. 4 illustrates a front view of the soldering station having multiple soldering tools connected thereto in accordance with an example embodiment.

FIG. 4 illustrates a situation where two different soldering tools (e.g., tool one 300 and tool two 310) are connected to the main unit 210. In FIG. 4, the cords that connect the tools to their respective ports are not shown to demonstrate how example embodiments may be helpful in certain situations. In this regard, if it is assumed that the cords overlap each other to the point that the cords would be difficult to trace from tool to port, then example embodiments may enable the operator to still quite easily and quickly determine which tool correlates to which port.

As shown in FIG. 4, the first ring indicator 250 of the first tool port 230 may be generating blue light 330. Meanwhile, the second ring indicator 252 of the second tool port 232 may be generating green light 340. Without regard for tracing cords back to either tool, the operator can quickly scan and see that tool one 300 has green light 340 being generated (e.g., from its indicator) and tool two 310 has blue light 330 being generated (e.g., from its indicator). Thus, the operator can quickly determine that tool one 300 is connected to the second tool port 232 and tool two 310 is connected to the first tool port 230. Information displayed on the display may also be spatially and/or color coordinated with each respective port and tool.

Figure 5:
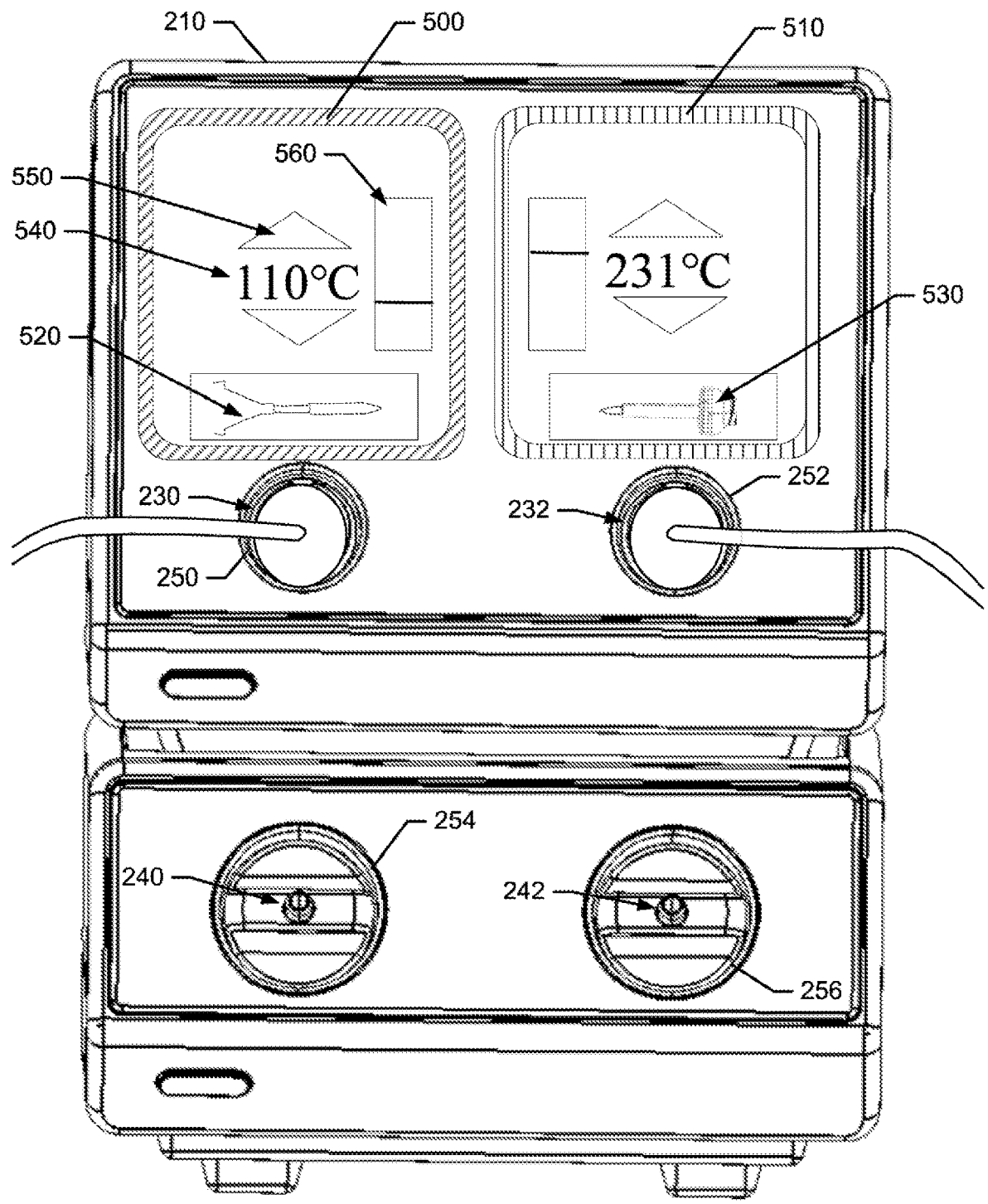
FIG. 5 illustrates a front view of the display of the soldering station in accordance with an example embodiment.

FIG. 5 provides a more detailed example of the information that may be provided on the display of the main unit 210 in accordance with an example embodiment. The display may provide the information bounded by a first color boundary 500 and a second color boundary 510, which may generally correspond to boundaries of regions of the display that define the first display portion 260 and the second display portion 262, respectively. The color generated on the first color boundary 500 may match the color associated with the first tool port 230, and the color generated on the second color boundary may match the color associated with the second tool port 232.

The first color boundary 500 may provide a boundary or outline inside which operational information and, in some cases, a visual depiction 520 of the corresponding tool (e.g., tool two 310). The second color boundary 510 may provide a boundary or outline inside which operational information and, in some cases, a visual depiction 530 of the corresponding tool (e.g., tool one 300). The processing circuitry 180 may be configured to interface with each tool and recognize identification information thereof in order to determine the corresponding visual depiction to select and display for each tool. Alternatively or additionally, the operator may be enabled to select the tool type and/or corresponding visual depiction from a library of tool types or visual depictions.

In some cases, the operator may be enabled to swipe across the first display portion 260 or the second display portion 262 in order to encounter other screens or information. For example, a swipe left or right may provide a screen for selecting the tool or visual depiction to display. Color selection for the first and second color boundaries 500 and 510 and/or for the tools or ports may also be accomplished in this way. More detailed information (e.g., specification details) for each tool or accessory may also be accessible via swiping to the side to encounter other screens.

Following on from the example of FIG. 4, the first color boundary 500 may be blue, and the second color boundary 510 may be green. However, as noted above, other colors could be employed. Moreover, the operator may interface with the processing circuitry 180 to change the colors assigned to each respective port based on a menu of available color options.

The operational information within the first and second color boundaries 500 and 510 may include temperature information 540. The temperature information 540 may be provided in Celsius or Fahrenheit scales, and the operator may select which scale to use. In an example embodiment, selectable operators 550 may also be displayed so that the temperature settings can be adjusted. In some cases, an operational range scale 560 or other data indicating, for example, the current temperature relative to a scale of possible operating temperatures or relative to the selected operating temperature may be displayed. The processing circuitry 180 may also enable, through interface at the display, the operator to customize various aspects of the information presented or presentable on the main unit 210. Thus, as can be appreciated from the descriptions above, the operator may very easily review various types of information while always having correlation information readily available regarding which tool is connected to which port, and which tool corresponds to the information displayed at a given location.

In this regard, the indicators at the ports, and the indicators at each respective soldering tool may form a device correlation system that enables correlation between devices and ports to which they are connected to be accomplished with quick visual reference. The device correlation system may further include the color boundaries and/or the visual depictions in some cases.

Figure 6:
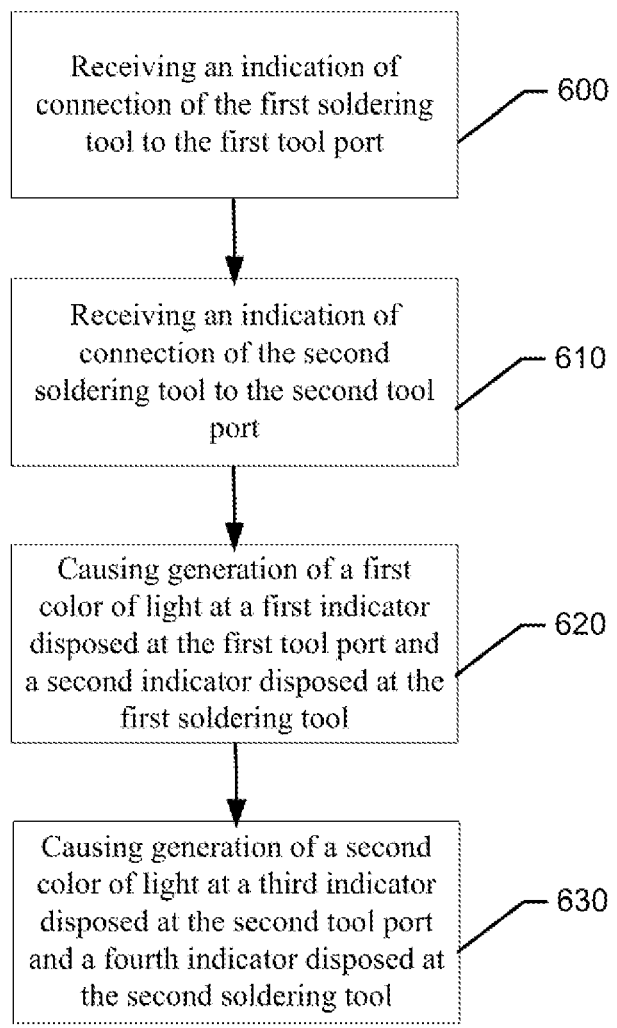
FIG. 6 illustrates a block diagram of a method in accordance with an example embodiment.

FIG. 6 shows a block diagram of a method of correlating devices to respective ports on a soldering station. In the context of FIG. 6, it should be understood that the soldering station may include a first tool port configured to interface with a first soldering tool, and a second tool port configured to interface with a second soldering tool as described above. The method may include receiving an indication of connection of the first soldering tool to the first tool port at operation 600, and receiving an indication of connection of the second soldering tool to the second tool port at operation 610. The method may further include causing generation of a first color of light at a first indicator disposed at the first tool port and a second indicator disposed at the first soldering tool at operation 620, and causing generation of a second color of light at a third indicator disposed at the second tool port and a fourth indicator disposed at the second soldering tool at operation 630. The first and second colors of light may be different from each other. In some cases, the operations 600 to 630 may follow an initial operation of receiving input from an operator of the soldering station to select the first color of light and the second color of light. It should also be appreciated that, in some cases, the method described above could be practiced with respect to just one port and one tool (i.e., just operations 600 and 620). In such a context, the light colors could (instead of differentiating tools and devices) provide information about device status (as described above). Thus, for example, an additional operation of selecting the first color or applying a display style based on status of the soldering tool may be applicable. The status information associated with the single tool would therefore be intuitively determinable at a glance as well.

Thus, according to an example embodiment, a soldering station may be provided. The soldering station may include a first tool port configured to interface with a first soldering tool, a second tool port configured to interface with a second soldering tool, a display configured to display information relating to one or both of the first and second soldering tools, and processing circuitry configured to interface with the display to provide the information relating to one or both of the first and second soldering tools. The first tool port may have a first indicator associated therewith and the second tool port may have a second indicator associated therewith. The first indicator may generate a first color that is also generated at a third indicator associated with the first soldering tool. The second indictor may generate a second color that is also generated at a fourth indicator associated with the second soldering tool, the first and second colors being different from each other.

In some cases, the soldering station described above may be augmented or modified by altering individual features mentioned above or adding optional features. The augmentations or modifications may be performed in any combination and in any order. For example, in some cases, the first and second colors may be selectable by an operator interfacing with the processing circuitry. In an example embodiment, the first indicator may include a first ring indicator extending around a periphery of the first tool port, and the second indicator may include a second ring indicator extending around a periphery of the second tool port. In some cases, the display may include a first display portion configured to display information associated with the first soldering tool, and a second display portion configured to display information associated with the second soldering tool. In an example embodiment, the first display portion may include a first color boundary having the first color, and the second display portion may include a second color boundary having the second color. In some cases, the first display portion or the second display portion may include a temperature indicator, and one or more selectable operators to enable adjustment of a temperature setting for a corresponding one of the first or second soldering tools. In an example embodiment, the first display portion or the second display portion may be configured to display a visual depiction of a respective one of the first soldering tool or the second soldering tool. In some cases, the visual depiction may be determined automatically by the processing circuitry responsive to connection of the first soldering tool or second soldering tool to the first tool port or the second tool port, respectively. In an example embodiment, the visual depiction may be selected by an operator interfacing with the processing circuitry from a list of tool types or visual depictions. In some cases, the first and second ring indicators may each include an annular lens and a plurality of LEDs, and the annular lens may direct light from the LEDs around the periphery of a corresponding one of the first tool port and the second tool port. In an example embodiment, the first and second tool ports are disposed at a main unit, and the soldering station may further include an accessory unit comprising a first accessory port and a second accessory port. In some cases, the first and second accessory ports may be configured to receive air hoses associated with a vacuum tool or a blower tool. In an example embodiment, the first accessory port may include a third ring indicator extending around a periphery of the first accessory port, and the second accessory port may include a fourth ring indicator extending around a periphery of the second accessory port. A color generated at the third ring indicator or the fourth ring indicator may be provided to match a corresponding color of a soldering tool with which an accessory associated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A soldering station comprising:
   a first tool port configured to interface with a first soldering tool;
   a second tool port configured to interface with a second soldering tool;
   a display configured to display information relating to one or both of the first and second soldering tools; and
   processing circuitry configured to interface with the display to provide the information relating to one or both of the first and second soldering tools,
   wherein the first tool port has a first indicator associated therewith and the second tool port has a second indicator associated therewith,
   wherein the first indicator generates a first color that is also generated at a third indicator associated with the first soldering tool,
   wherein the second indictor generates a second color that is also generated at a fourth indicator associated with the second soldering tool, the first and second colors being different from each other.

2. The soldering station of claim 1, wherein the first and second colors are selectable by an operator interfacing with the processing circuitry.

3. The soldering station of claim 1, wherein the first indicator comprises a first ring indicator extending around a periphery of the first tool port, and
   wherein the second indicator comprises a second ring indicator extending around a periphery of the second tool port.

4. The soldering station of claim 3, wherein the display comprises a first display portion configured to display information associated with the first soldering tool, and a second display portion configured to display information associated with the second soldering tool.

5. The soldering station of claim 4, wherein the first display portion includes a first color boundary having the first color, and the second display portion includes a second color boundary having the second color.

6. The soldering station of claim 4, wherein the first display portion or the second display portion includes a temperature indicator, and one or more selectable operators to enable adjustment of a temperature setting for a corresponding one of the first or second soldering tools.

7. The soldering station of claim 4, wherein the first display portion or the second display portion is configured to display a visual depiction of a respective one of the first soldering tool or the second soldering tool.

8. The soldering station of claim 7, wherein the visual depiction is determined automatically by the processing circuitry responsive to connection of the first soldering tool or second soldering tool to the first tool port or the second tool port, respectively.

9. The soldering station of claim 7, wherein the visual depiction is selected by an operator interfacing with the processing circuitry from a list of tool types or visual depictions.

10. The soldering station of claim 3, wherein the first and second ring indicators each comprise an annular lens and a plurality of light emitting diodes (LEDs), the annular lens directing light from the LEDs around the periphery of a corresponding one of the first tool port and the second tool port.

11. The soldering station of claim 3, wherein the first and second tool ports are disposed at a main unit, and wherein the soldering station further comprises an accessory unit comprising a first accessory port and a second accessory port.

12. The soldering station of claim 8, wherein the first and second accessory ports are configured to receive air hoses associated with a vacuum tool or a blower tool.

13. The soldering station of claim 8, wherein the first accessory port comprises a third ring indicator extending around a periphery of the first accessory port,
   wherein the second accessory port comprises a fourth ring indicator extending around a periphery of the second accessory port, and
   wherein a color generated at the third ring indicator or the fourth ring indicator matches a corresponding color of a soldering tool with which an accessory associated.

14. A device correlation system for a soldering station, the soldering station includes a first tool port configured to interface with a first soldering tool, and a second tool port configured to interface with a second soldering tool, the device correlation system comprising:
   a first indicator disposed at the first tool port;
   a second indicator disposed at the second tool port;
   a third indicator disposed at the first soldering tool; and
   a fourth indicator disposed at the second soldering tool,
   wherein the first and third indicators are configured to each generate a first color, and the second and fourth indicators are configured to each generate a second color, the first and second colors being different from each other.

15. The device correlation system of claim 14, wherein the first and second colors are selectable by an operator interfacing with the soldering station.

16. The device correlation system of claim 14, wherein the first indicator comprises a first ring indicator extending around a periphery of the first tool port, and
   wherein the second indicator comprises a second ring indicator extending around a periphery of the second tool port.

17. The device correlation system of claim 16, wherein the soldering station further comprises a display having a first display portion configured to display information associated with the first soldering tool, and a second display portion configured to display information associated with the second soldering tool.

18. The device correlation system of claim 17, wherein the first display portion includes a first color boundary having the first color, and the second display portion includes a second color boundary having the second color.

19. A method of correlating devices to respective ports on a soldering station, the soldering station including a first tool port configured to interface with a first soldering tool, and a second tool port configured to interface with a second soldering tool, the method comprising:
   receiving an indication of connection of the first soldering tool to the first tool port;
   receiving an indication of connection of the second soldering tool to the second tool port;
   causing generation of a first color of light at a first indicator disposed at the first tool port and a second indicator disposed at the first soldering tool; and
   causing generation of a second color of light at a third indicator disposed at the second tool port and a fourth indicator disposed at the second soldering tool,
   wherein the first and second colors of light are different from each other.

20. The method of claim 19, further comprising receiving input from an operator of the soldering station to select the first color of light and the second color of light.

* * * * *